United States Patent [19]

Alferness et al.

[11] Patent Number: 4,553,810

[45] Date of Patent: Nov. 19, 1985

[54] TRAVELING WAVE ELECTROOPTIC DEVICES

[75] Inventors: Rodney C. Alferness, Holmdel; Steven K. Korotky, Toms River; Enrique A. J. Marcatili, Rumson, all of N.J.

[73] Assignee: AT&T Bell Laboratories, Murray Hill, N.J.

[21] Appl. No.: 487,249

[22] Filed: Apr. 21, 1983

[51] Int. Cl.[4] .............................................. G02B 5/174
[52] U.S. Cl. ............................ 350/96.14; 350/96.12; 350/96.13
[58] Field of Search ............... 350/96.10, 96.11, 96.12, 350/96.13, 96.14, 96.15; 250/227

[56] References Cited

U.S. PATENT DOCUMENTS

| | | | |
|---|---|---|---|
| 4,380,364 | 4/1983 | Marcatili | 350/96.14 |
| 4,384,760 | 5/1983 | Alferness | 350/96.14 |
| 4,448,479 | 5/1984 | Alferness | 350/96.14 |
| 4,468,086 | 8/1984 | Liu | 350/96.14 |

*Primary Examiner*—William L. Sikes
*Assistant Examiner*—Brian M. Healy
*Attorney, Agent, or Firm*—Sylvan Sherman; Eugen E. Pacher

[57] ABSTRACT

Prior art techniques for velocity matching the optical wave and the modulating electrical wave in traveling wave, electrooptic devices includes the use of phase reversals and intermittent interaction. This results in a device whose frequency response includes a single peak. It has been discovered that by reducing the length of the interaction intervals between the electrical and optical systems, a multiplicity of harmonically related frequency peaks can be obtained. Furthermore, by combining the phase reversal and intermittent interaction techniques in a common device, the available bandwidth can be doubled.

18 Claims, 21 Drawing Figures

FIG. I
(PRIOR ART)

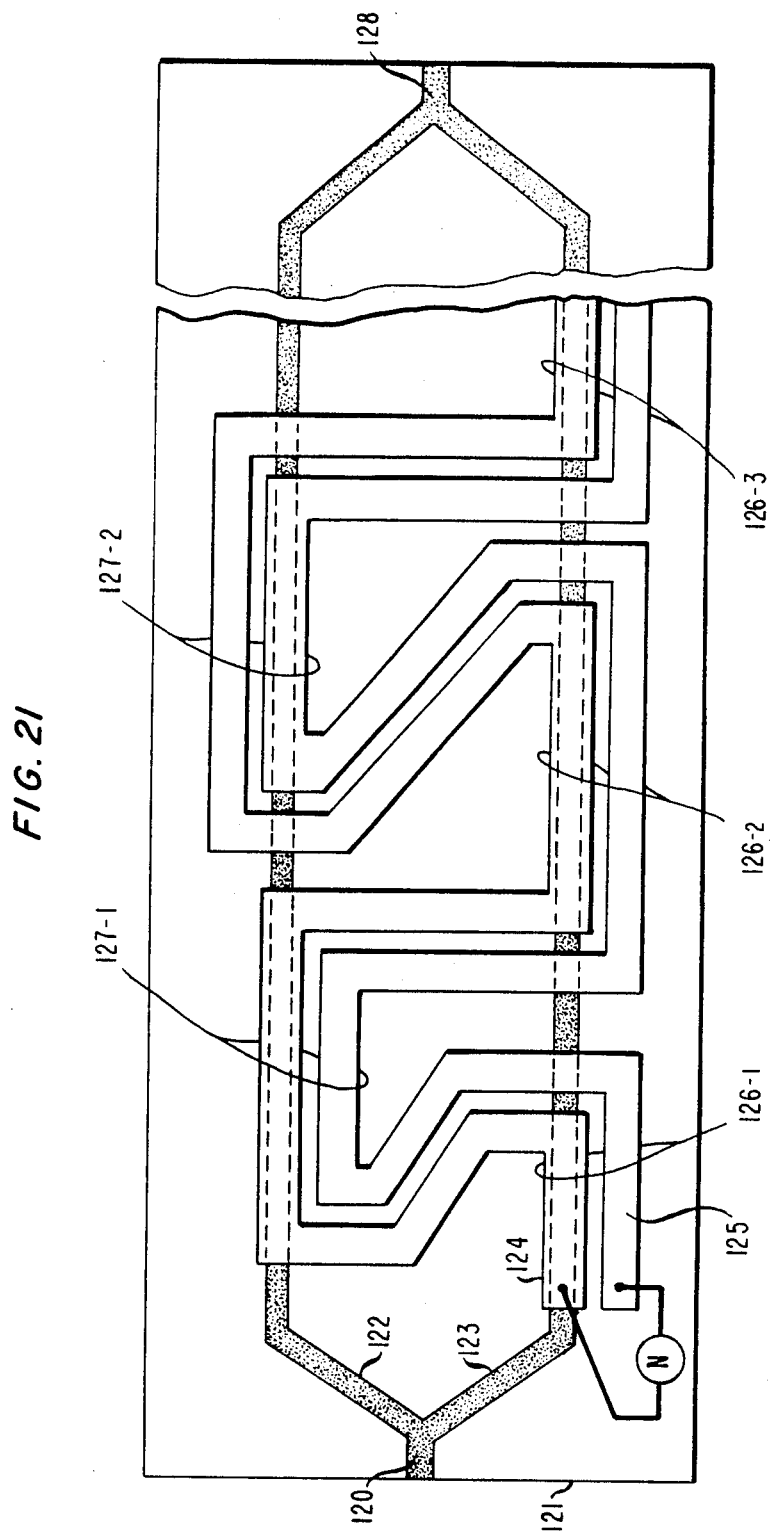

4,553,810

1

TRAVELING WAVE ELECTROOPTIC DEVICES

TECHNICAL FIELD

This application relates to traveling wave electrooptic devices such as switches, modulators, phase shifters and mode converters.

BACKGROUND OF THE INVENTION

Traveling wave electrooptic devices, in which the optical wave and the modulating (i.e., microwave) electrical wave propagate with the same velocities, have very broad operating bandwidths. However, for important materials used in the fabrication of these devices, such as lithium niobate, there is an inherent mismatch between the two velocities. As a consequence if modulation above the "walk-off" frequency is to be obtained, the electrical signal wavepath must be specially designed in order to compensate for the velocity mismatch which exists. In the traveling wave devices disclosed in the copending application of P. P. Liu, Ser. No. 318,353, filed Nov. 5, 1981, now U.S. Pat. No. 4,468,086, the problem of velocity mismatch is dealt with by means of a meandering electrode. The electrode is shaped so as to interact with the optical wavepath over a first interval where the direction of the electrical signal has one sense (i.e., polarity), and not to interact over a second interval where the sense is reversed. In the traveling wave device disclosed in the copending application of R. C. Alferness, Ser. No. 321,475, filed Nov. 16, 1981, now U.S. Pat. No. 4,448,479, there is interaction over the entire length of the electrode. However, the electrodes are periodically displaced so as to introduce a structural polarity reversal which compensates for the electrical polarity reversal caused by the velocity mismatch.

In both of the above-described types of devices the resulting frequency characteristic includes a single peak at a designated frequency. Furthermore, the ability to control where this bandwidth falls (i.e., what frequencies are included within the response characteristic of the device) is limited. What is needed is a technique for distributing the available bandwidth over the frequency spectrum of interest. For example, to generate or switch a pulse train of very narrow pulses requires a device whose response includes a plurality of harmonically related passbands. Prior art traveling wave devices do not possess such a frequency characteristic. It is, accordingly, the broad object of the present invention to provide a mechanism for both varying and increasing the frequency characteristic of traveling wave electrooptic devices.

SUMMARY OF THE INVENTION

The present invention is based upon the discovery that by reducing the length of the interaction intervals between the electrical and optical wavepaths, a multiplicity of harmonically related frequency peaks can be obtained. More specifically, for any pair of carrier and modulating signal wavelengths there is a coherence length over which the polarity of the modulating signal is in a given direction. By making the interaction intervals small relative to this coherence length the desired result is obtained. In addition, by combining features of the Liu and Alferness devices the available bandwidth of such devices can be doubled.

BRIEF DESCRIPTION OF THE DRAWING

FIG. 21 shows an illustrative embodiment of a modulator using both phase reversal and intermittent interaction electrode configurations.

DETAILED DESCRIPTION

While the principles of the invention are equally applicable to a variety of traveling wave devices such as phase shifters, directional couplers, and mode converters, the frequency response analysis is more straightforward in the case of the phase shifter. Accordingly, an electrooptic phase shifter is used as the illustrative embodiment to be described in detail hereinbelow. The application of the principles of the invention to other devices is also described.

Prior Art Electrooptic Devices with Phase Reversal

Figure 1:
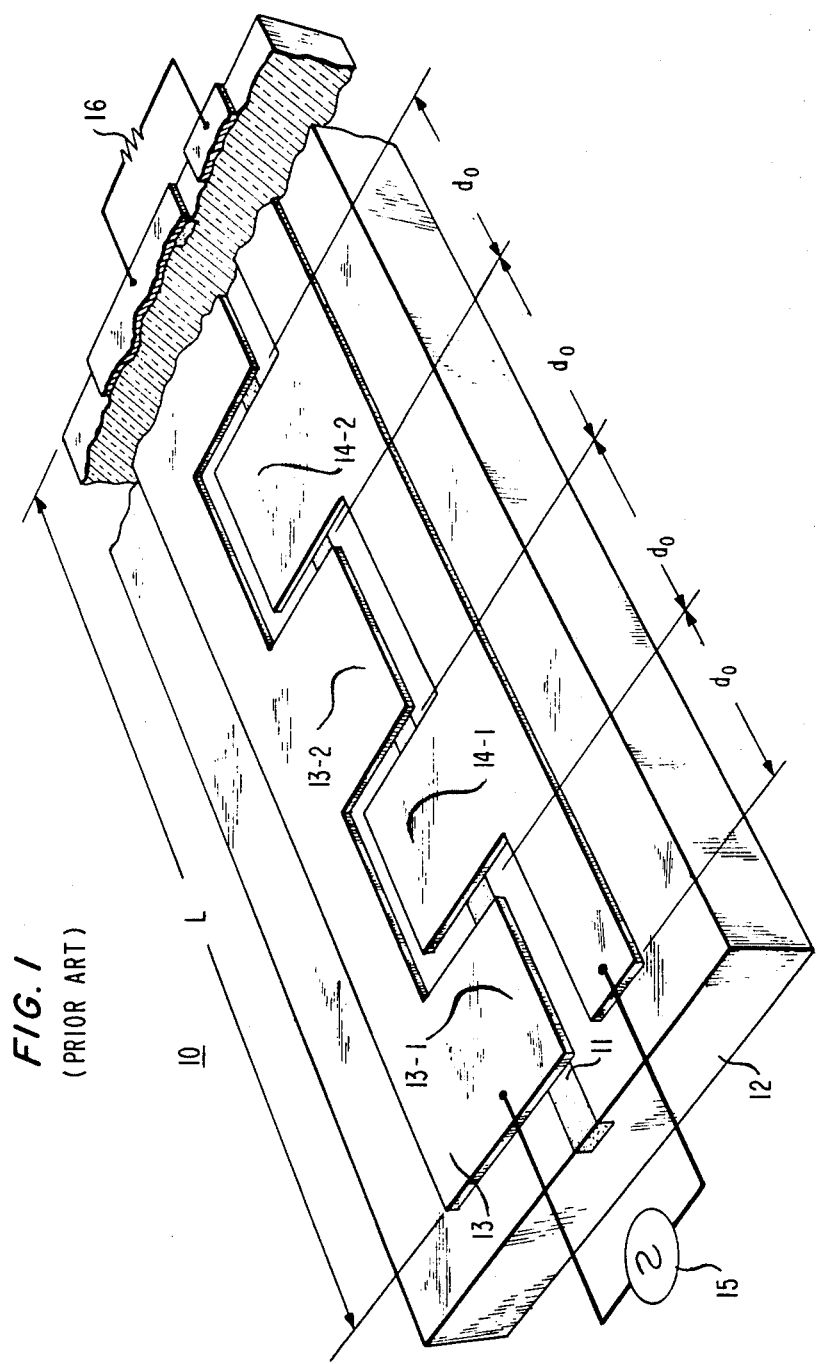
FIG. 1 shows a prior art traveling wave, electrooptic phase shifter employing phase reversal electrodes to affect velocity matching.

Referring to the drawings, FIG. 1 shows a prior art phase shifter with effective velocity matching as described in the above-identified Alferness application. The device 10 comprises a dielectric waveguiding strip 11 embedded in a substrate 12 of lower refractive index birefringent material, and means for modulating the propagation constants of the orthogonally polarized TE and TM modes of wave propagation by means of the electrooptic effect. In the illustrative embodiment of FIG. 1 this modulation is effected by means of a pair of conductive finger electrodes 13 and 14 superimposed upon the substrate and waveguiding strip. The electrodes, which form a planar strip transmission line, extend coextensively over an interval L of the optical wavepath and are arranged relative to each other such that the fingers 13-1, 13-2 . . . of electrode 13, and the fingers 14-1, 14-2 . . . of electrode 14 are interleaved. The length of each of the fingers along the direction of wave propagation is equal to the coherence length $d_o$ for the desired operating frequency. The coherence length is defined in greater detail hereinbelow.

The transmission line formed by the electrodes is energized at one end by a modulation signal source 15, and is match-terminated by an appropriate impedance 16 at its other end.

As explained in the above-identified Liu and Alferness applications, because of the velocity mismatch between the optical and electrical signals, the two signals do not propagate in synchronism. This produces what is referred to as a "walk-off" effect. In the instant case, where the optical wave propagates at a faster velocity than the electrical wave, photons entering at any instant tend to "catch up" with the electrical wave. As a result, in the absence of any compensating arrangements, the electrical field, and hence the difference $\Delta\beta$ in the phase constants seen by the two modes, varies as a function of distance along the phase shifter. For the case of a uniform electrode configuration (not shown), the $\Delta\beta$ variations seen by a photon entering at the instant the modulating signal (represented by curve 30 in FIG. 3) is zero as illustrated by curve 20 in FIG. 2, where the electrode segments $d_1, d_2 \ldots d_6$ are all equal. Because the optical signal propagates more rapidly than the electrical signal, these photons "catch up" with portions of the previously applied modulating signal depicted by the $-t$ portion of curve 30. In particular, in an interval $d_1+d_2$, the photons see a complete modulating voltage ($V_m$) cycle and the corresponding spatial $\Delta\beta$ variation. The spatial intervals $d_1, d_2, \ldots d_6$ over which the polarity of $\Delta\beta$ is either positive or negative is called the coherence length and is given, as a function of the design wavelength $\lambda_m$, by $$d_o = \frac{\lambda_m}{2N_m}\left(1 - \frac{N_o}{N_m}\right)^{-1} \quad (1)$$

where
- $\lambda_m$ is the wavelength of the modulating signal in free space;
- $N_m$ is the effective refractive index at the modulating signal wavelength;

and
- $N_o$ is the effective refractive index at the optical signal wavelength.

Figure 2:
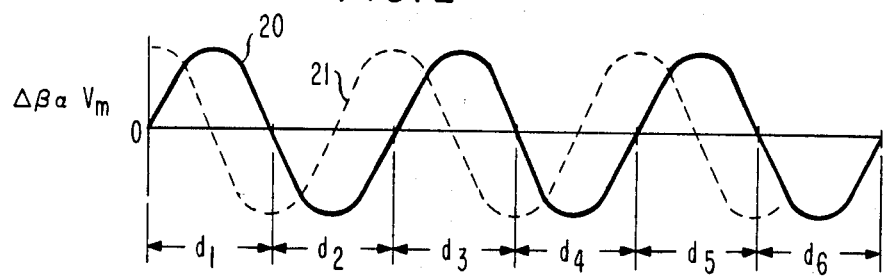
FIG. 2 shows the variations in $\Delta\beta$ as seen by photons entering the phase shifter of FIG. 1 at two different phases of the modulating signal.
Figure 3:
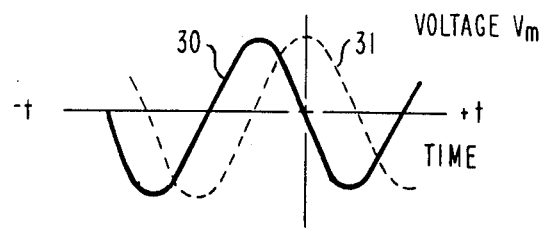
FIG. 3 shows the modulating signal as a function of time.

A similar $\Delta\beta$ variation occurs for photons entering at other times during the modulating signal cycle, as indicated by curve 21 in FIG. 2. The latter corresponds to a 90 degree phase shift in the modulating signal, as represented by curve 31 in FIG. 3.

Figure 4:
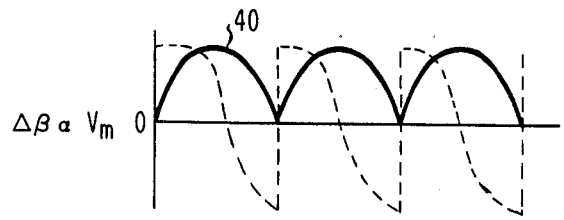
FIG. 4 shows the effect of the phase reversal electrode configuration on the variation of $\Delta\beta$ along the optical waveguide.

Both of the curves 20 and 21 in FIG. 2 illustrate the effect of walk-off on $\Delta\beta$. Specifically, there is a regular recurring phase (i.e., polarity) reversal in $\Delta\beta$ such that the integrated effect over the length of the device is very small. To avoid the effect of walk-off, Alferness produces a 180 degree phase (i.e., polarity) reversal in $\Delta\beta$ by introducing a physical displacement of the two electrodes so that the direction of the modulating field is reversed. Thus, over the first interval, finger 13-1 of electrode 13 extends over the waveguiding strip 11 whereas over the second interval finger 14-1 of electrode 14 extends over strip 11. In particular, by making each of the intervals equal to $d_o$ the effect of this physically produced phase reversal is to produce a rectification of the spatial variations of $\Delta\beta$ as illustrated by curve 40 in FIG. 4. Thus, with respect to photons entering when the modulating signal amplitude is zero, the induced phase shift in each section has the same sense and, as a result, all the sections add in phase. The electrode sections are essentially phase locked with respect to their effect upon the optical wave. Consequently, the total interaction length $Nd_o$, where N is the number of fingers, can be arbitrarily long (in the absence of losses) without degradation due to velocity mismatch, and the drive voltage can be correspondingly reduced.

Because the coherence length depends upon the modulating frequency, the velocity match condition is also a function of the modulating signal frequency, $f_d$, as given by $$\left(\frac{2\pi N_m}{c}\right) \cdot f_d \cdot \delta d_o = \pi. \quad (2)$$

where $\delta = 1 - N_o/N_m$. Thus, for any arbitrary frequency $f_m \neq f_d$, the electrode induced reversal of the electric field is not matched to the walk-off induced polarity reversal, and incomplete or no effective velocity matching results.

Figure 5:
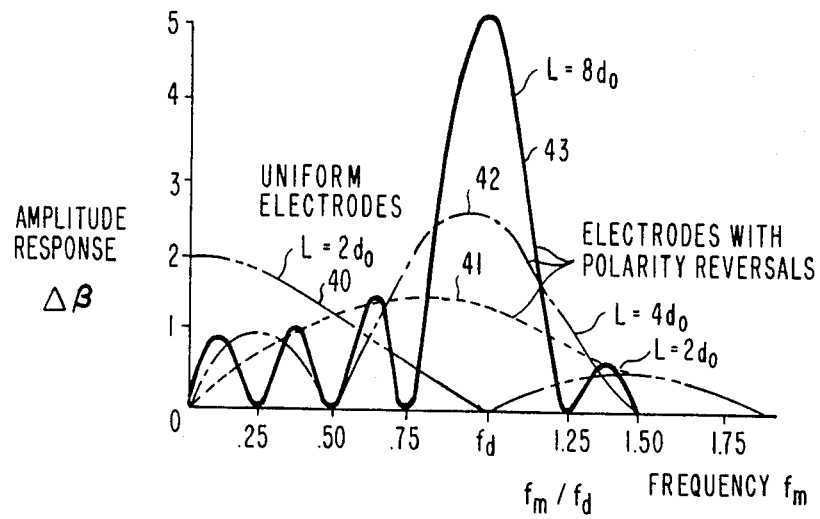
FIG. 5 shows the amplitude-frequency response of the phase shifter of FIG. 1 for different numbers of electrode sections.

FIG. 5 shows the effect of phase reversal upon frequency characteristic of traveling wave devices. In the case of a uniform electrode of length $L=2d_o$, the response curve 40 is a maximum at zero frequency and decreases to zero response at a frequency $f_d$, as given by equation (2). The response for $f_m > f_d$ is a series of decreasing lobes. For the case of $L=2d_o$ with polarity reversal, a broad response is obtained which is zero at zero frequency and peaks at a frequency slightly below $f_d$, as illustrated by curve 41. As additional sections of electrode are added there is an increase in the amplitude of the response, which tends to peak at $f_m = f_d$, and a reduction in the bandwidth. In addition, there is a series of smaller lobes above and below $f_d$ which decrease in amplitude. The side lobes in all cases are too small to be useful, but large enough to be detrimental in that they consume bandwidth. Further reference will be made to these curves hereinbelow.

Figure 6:
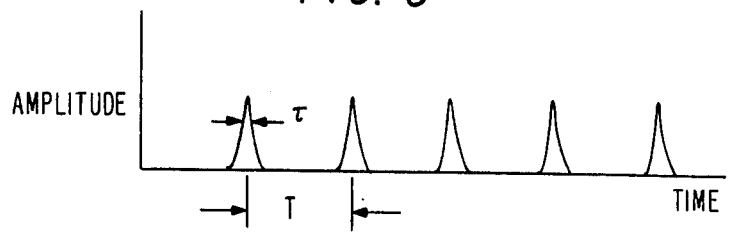
FIGS. 6 and 7 show the time and frequency characteristics of a train of pulses.
Figure 7:
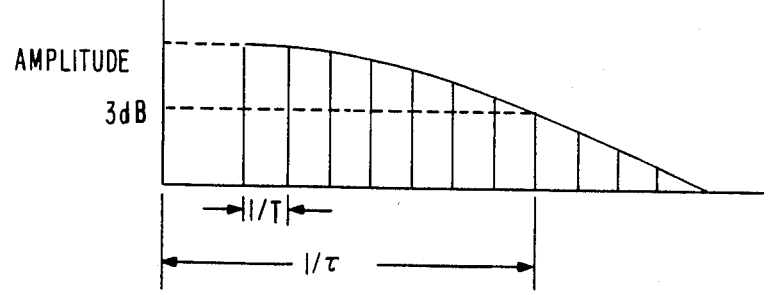

While the ability to change the frequency response of traveling wave devices from lowpass to bandpass at some arbitrary high frequency is useful, there are applications for which such a response is inadequate. For example, to modulate a cw optical wave so as to produce a train of optical pulses requires a modulating signal of the type illustrated in FIG. 6. This modulating signal comprises a train of pulses of width $\tau$ and spacing T. The frequency equivalent of such a signal, illustrated in FIG. 7, includes a plurality of harmonically related components that are spaced apart an amount $1/T$, and whose amplitudes decrease with increasing frequency reaching a $-3$ dB level at frequency $1/\tau$. Clearly the essentially single response characteristics of the prior art devices illustrated in FIG. 5 are inadequate to satisfy these requirements.

Electrooptical Devices with Multifrequency Response Characteristics Employing Phase Reversal A traveling wave electrooptic device having a multifrequency response characteristic is obtained in accordance with the present invention by limiting the interval over which interaction between the optical wave and the modulating wave occurs to a distance that is less than the coherence length $d_o$.

1. Phase Shifter with Phase Reversal

Figure 8:
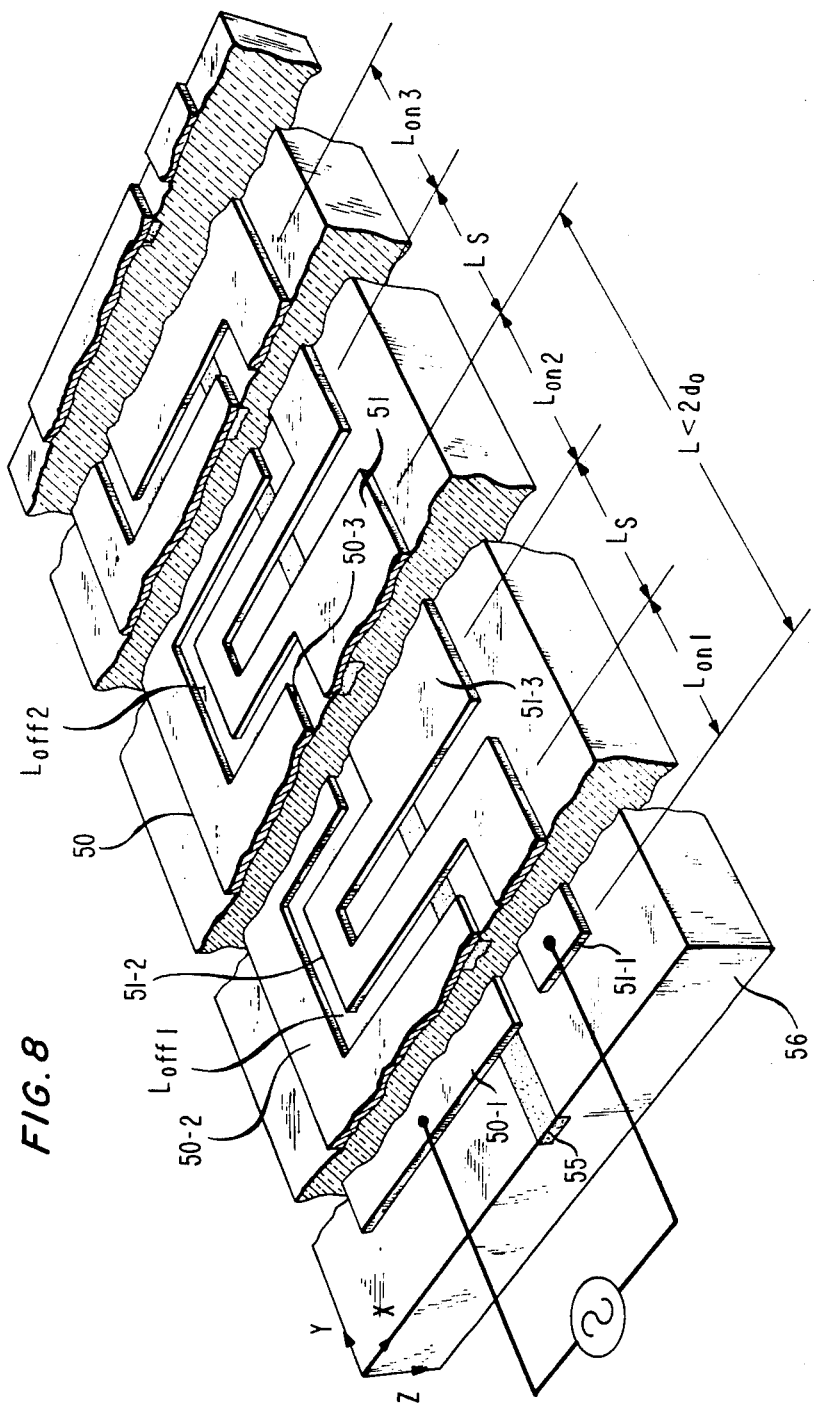
FIG. 8 shows the phase-shifter of FIG. 1 modified in accordance with the present invention.

In a first embodiment of the invention, using the basic phase shifter of FIG. 1 for purposes of illustration, the electrode configuration is modified so that in addition to providing the above-described polarity reversals, intervals are introduced along which there is no interaction between the propagating waves. One realization of such an electrode configuration is illustrated in FIG. 8 which shows a portion of the phase shifter comprising a dielectric waveguiding strip 55 embedded in a substrate 56. Modulating electrodes 50 and 51, superimposed upon the waveguiding strip and substrate, are shaped to include regions of interaction and regions of noninteraction. Along a first interaction region formed by electrode portions 50-1 and 51-1, the former extends over waveguiding strip 55. In a second interaction region formed by electrode portions 50-3 and 51-3, the latter extends over waveguiding strip 55. This displacement of the electrode portions relative to the optical wavepath provides the desired polarity reversal described hereinabove with regard to FIG. 1. Unlike the prior art embodiment, however, the two interaction portions are separated by a noninteraction region made of electrode portions 50-2 and 51-2 neither one of which is in the region of waveguiding strip 55. The lengths $L_{on1}$, $L_{on2}$ ... of the interaction regions along the v direction (i.e. along the direction of optical wave propagation) are all equal and designed to be less than the coherence length $d_o$, but very much larger than the distance $L_s$ occupied by the noninteraction regions in the direction along the optical waveguide. As an example, in a phase shifter designed to operate at 10 Ghz, $L_{on}=7.5$ mm and $L_s=100$ μm.

Figure 9:
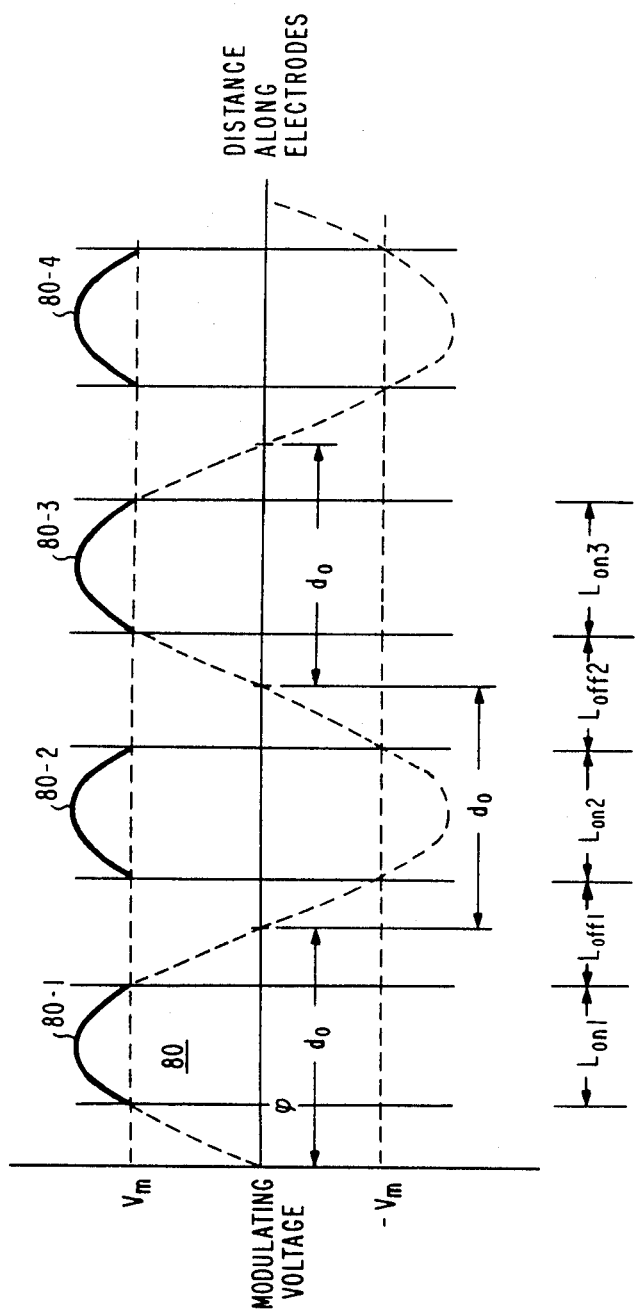
FIGS. 9 and 10 show the effect upon the $\Delta\beta$ distribution along the phase shifter of FIG. 8 when modified in accordance with the invention.
Figure 10:
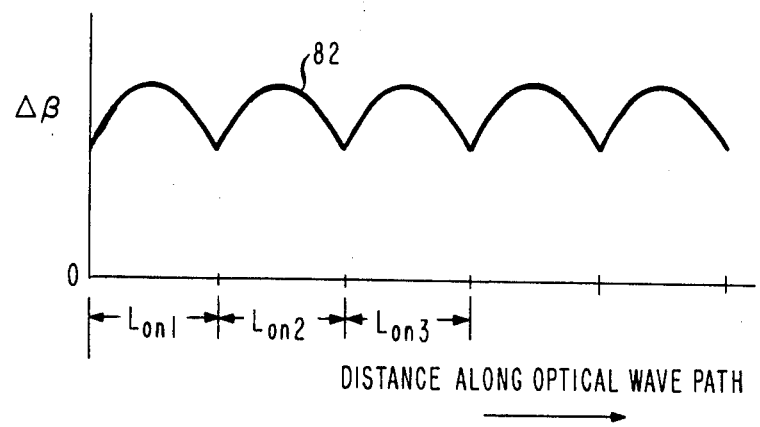

The effect of this modified electrode configuration upon the optical wave can be understood by referring to FIGS. 9 and 10 which show, respectively, the modulating voltage as a function of distance along the electrodes, and the resulting induced $\Delta\beta$ as a function of distance along the optical wavepath. With regard to FIG. 9, the particular modulation signal illustrated is a sinusoid. Interaction with the optical wave, however, occurs only along the interaction intervals $L_{on1}$, $L_{on2}$, $L_{on3}$, .... No interaction is produced along the "off" regions $L_{off1}$, $L_{off2}$, .... Thus, a photon entering at a time corresponding to phase $\phi$ of the modulating signal sees the modulating wave portion 80-1 as it traverses the first "on" interval $L_{on1}$. Neglecting $L_s$ which, as indicated above, is very much smaller than $L_{on}$, the optical wave upon entering the second interaction interval sees modulating wave portion 80-2. The latter, of course, is the wave portion that has been rectified by the polarity reversal produced by the transverse electrode displacement. Similarly, along each interaction region the photon sees only the peak portions 80-1, 80-2, 80-3... of the modulating signal, producing the rectified $\Delta\beta$ curve 82 shown in FIG. 10.

If we define an aspect ratio R as $$R = \frac{L_{off}}{\delta L_{on}}. \tag{3}$$

we have for the prior art device, wherein $L_{off}=0$, an aspect ratio of zero. For the present invention, by contrast, $R>0$. It will be noted that the larger the aspect ratio the smaller the portion of the $\Delta\beta$ curve that is used, but the larger the average value of $\Delta\beta$.

The velocity match condition for any arbitrary aspect ratio is given by $$\frac{2\pi N_m f_d \delta L_{on}}{c} \cdot (1 + R) = \pi, \tag{4}$$

which is the more generalized version of equation (2).

To analyze the response characteristic of a phase shifter incorporating the teachings of the present invention, an expression for the integrated, electrooptically-induced $\Delta\beta$ was derived as a function of the modulating frequency, $f_m$. The results of this derivation is given by $$\Delta\theta = (\Delta\beta_o L) \frac{\sin(\phi_1/2)}{\phi_1/2} \frac{\sin\left[\frac{N}{2}(\phi_2 + \pi)\right]}{\cos(\phi_2/2)} \sin(\alpha - 2\pi f_m t_o) \tag{5}$$

where $\Delta\beta_o$ is the maximum electrooptically induced difference in the phase constants;
N is the number of sections;
L is the total interaction length;

$$\phi_1 = \frac{2\pi N_m}{c} f_m \delta L_{on}; \tag{6}$$

$$\phi_2 = \frac{2\pi N_m}{c} f_m \delta L_{on}(1 + R) \tag{7}$$

$$= \frac{2\pi N_m}{c} f_m \delta \left(L_{on} + \frac{L_{off}}{\delta}\right) \tag{8}$$

and $\alpha$ is a phase constant equal to $$\left(\frac{N-1}{2}\right)(\phi_2 + \pi) + \phi_1/2. \tag{9}$$

It will be noted that the amplitude portion of equation (5) is the product of two frequency sensitive terms. The first term, $\sin(\phi_1/2)/(\phi_1/2)$, has the same sin x/x response characteristic as the nonvelocity matched device illustrated by curve 40 in FIG. 5. This function decreases from its maximum value at zero frequency, reaching zero for $\phi_1=2\pi$ at a cutoff frequency $f_m=f_c$ that is inversely proportional to $L_{on}$ (see equation [6]).

Figure 11:
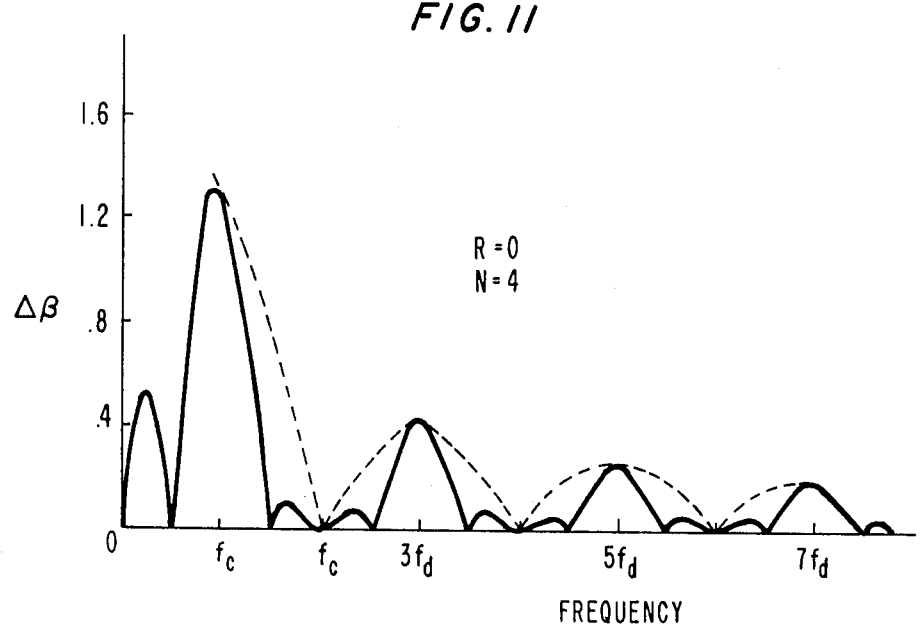
FIGS. 11, 12 and 13 show the effect upon the frequency characteristic of the phase shifter of FIG. 8 for different "on-off" aspect ratios.
Figure 12:
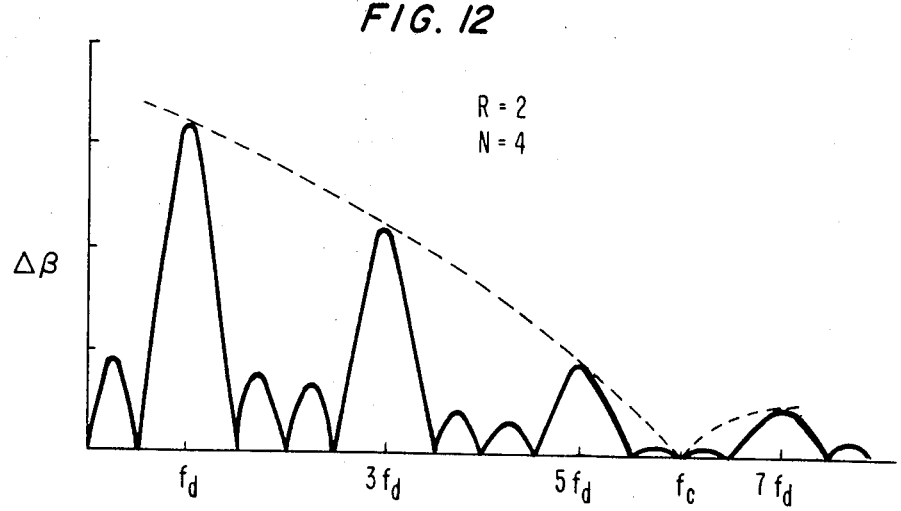
Figure 13:
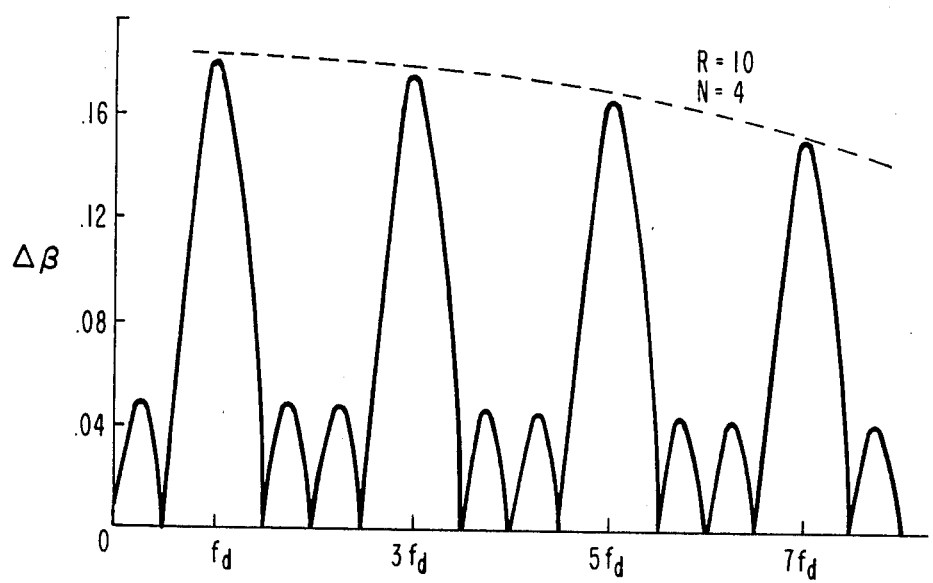

The second term, $[\sin(N/2)(\phi_2+\pi)]/\cos(\phi_2/2)$, is essentially a phase-locking term that describes the additive effect of the N sections. This term peaks whenever $\phi_2$, given by equation (8), is equal to an odd multiple of $\pi$. The frequencies, $f_d$, $3f_d$ ... $nf_d$, at which the peaks occur is an inverse function of the coherence length $(L_{on}+L_{off}/\delta)$. The number of peaks that appear in the overall device response depends upon the relative values of $f_c$ and $f_d$. The former, $f_c$, which is a function of $L_{on}$, can be made large by making $L_{on}$ small. $f_d$, on the other hand, is a function of both $L_{on}$ and $L_{off}$. Thus, the envelope term and the phase locking term can be independently designed to provide the desired overall response characteristic. This is illustrated in FIGS. 11, 12 and 13 which show the response curves for four (N=4) electrode sections (i.e., pairs of "on"-"off" intervals), where R=0, 2 and 10. In the prior art case, shown in FIG. 11, where R=0, there is one principal lobe (i.e., $R+1=1$), and the cutoff frequency, $f_c$, is equal to $2f_d$. FIG. 12 shows the response for $R=2$. For this case $f_c$ is equal to $6f_d$, and there are three principal lobes. FIG. 13 shows four of the eleven principal lobes for the case of $R=10$. In all cases, the envelope term is shown in broken line. The resulting amplitude characteristic is shown in solid line.

As indicated hereinabove, the principles of the invention are equally applicable to other devices using the phase reversal method of simulating velocity match, and to other velocity matching techniques such as the intermittent interaction produced by the meandering electrode described by Liu in his above-identified application. Examples of these applications are illustrated in FIGS. 14 through 18.

2. Mode Converter with Phase Reversal

Figure 14:
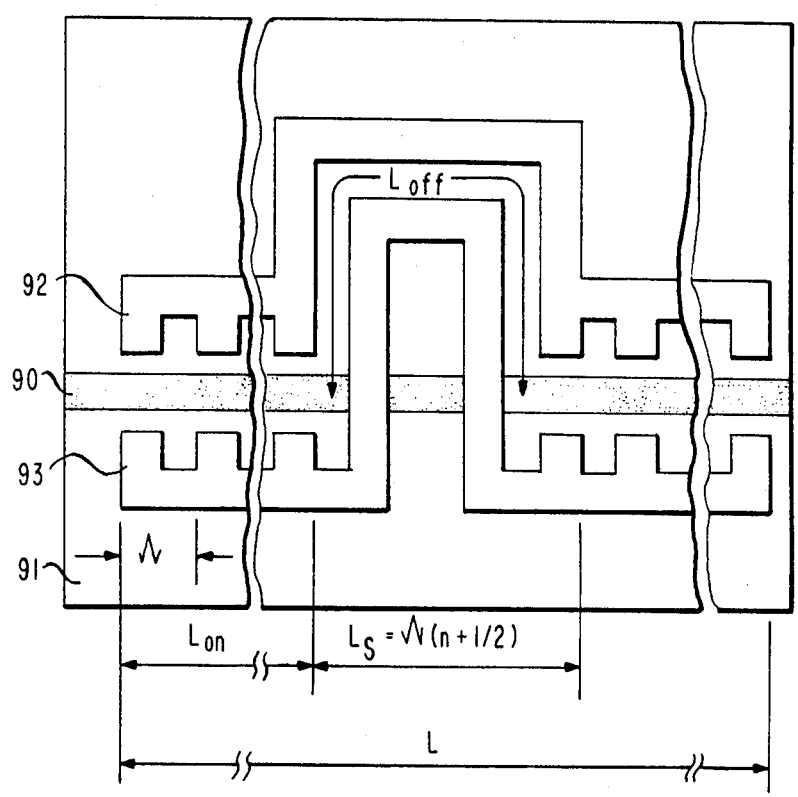
FIGS. 14, 15, 16, 17 and 18 show various other embodiments of the present invention.

FIG. 14 shows a portion of a TE⇌TM mode converter in accordance with the invention comprising a waveguiding strip 90 embedded in a substrate 91 of lower refractive index electrooptic material. A pair of electrodes 92 and 93, forming a planar strip transmission line, are suitably disposed along an interval L of strip 70. In operation, a modulation signal source and a matching terminating impedance (neither shown) are connected at opposite ends of the electrodes.

Because of the difference in the refractive indices seen by the two modes, finger electrodes are employed to produce a phase match between the optical TE and TM modes where the spatial period, of the fingers is $$\frac{1}{\quad} = = \frac{1}{\lambda_o} [N_{TE} - N_{TM}] \qquad (10)$$

where $\lambda_o$ is the free-space wavelength of the optical signal of interest;

and $N_{TE}$ and $N_{TM}$ are the effective refractive indices seen by the TE and TM modes, respectively.

Depending upon the cut of the substrate material, the electrode fingers are either interleaved or arranged opposite each other, as shown in FIG. 14.

As explained in the above-identified application by Alferness, to compensate for the effect of walk-off, a polarity reversal is introduced in the modulating signal at intervals equal to the coherence length. This is done by means of a discontinuity in the finger spacing along the electrodes equal to 2. The electrode configuration is further modified in accordance with the present invention by the addition of an "off" interval, $L_{off}$, along the electrodes in the manner explained in connection with the phase shifter shown in FIG. 8. Specifically, after an interval, $L_{on}$, which is less than the coherence length, the electrodes are transversely displaced away from the optical wavepath formed by waveguiding strip 90, thereby decoupling the two circuits. To provide the desired polarity reversal in the electric field direction along the next "on" interval, the longitudinal distance $L_s$ along the optical waveguiding strip occupied by the displaced electrodes is made equal to $(n+\frac{1}{2})$, where n is any integer, and $L_s$ is measured between corresponding points on the electrodes.

It should be again noted that the "on" interval, $L_{on}$, is typically very much larger thah the spatial period, , and also very much larger than $L_s$. The relative magnitudes of $L_{on}$ and $L_{off}$ (i.e., the value of R) are determined in accordance with those considerations discussed hereinabove.

3. Directional Coupler with Phase Reversal

Figure 15:
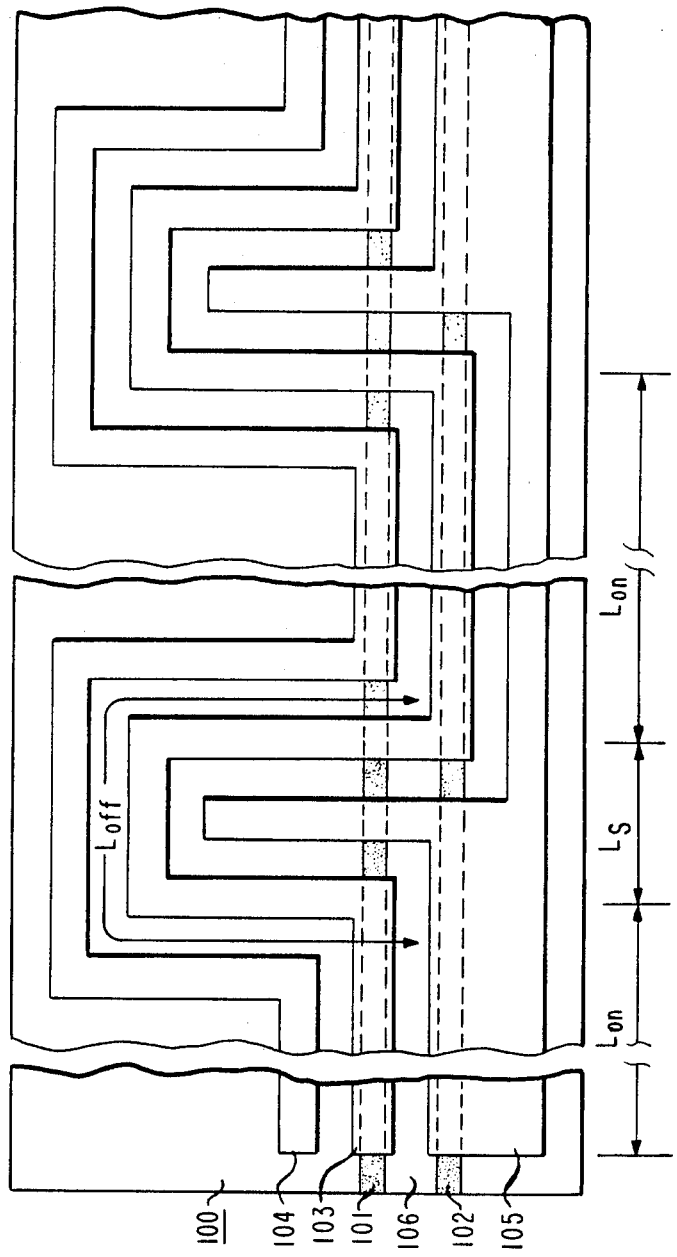

FIG. 15 shows the principles of the invention applied to a directional coupler 100. As in the prior art, the coupled waveguides 101 and 102 are a pair of substantially identical parallel waveguiding strips embedded in a substrate 106 of lower index electrooptic material. Superimposed upon the substrate and the optical waveguides are three conductive electrodes 103, 104 and 105 which extend coextensively along an interval L of the coupled optical waveguides. In this embodiment, the electrodes comprise an inner electrode 103 and two outer ground electrodes 104 and 105 which, together form a coplanar strip transmission line.

To provide the desired polarity reversal, the inner electrode meanders so as to extend alternately over each of the optical wavepaths 101 and 102. The outer electrodes 104 and 105 similarly meander such that one or the other of said electrodes extends over those portions of the optical waveguides not covered by the inner electrode.

Along the first interacting interval, $L_{on}$, electrode 103 is located above waveguide 101, and electrode 105 is located above waveguide 102. This is followed by an "off" interval, along which the center electrodes is displaced relative to both optical wavepaths so that no interaction occurs. The two outer electrodes are similarly displaced so as to maintain continuity along the strip transmission line. Following this "off" interval, the center electrode extends over the other waveguide 102 and electrode 104 extends over waveguide 101, thus providing a polarity reversal over the second "on" interval. This is then followed by a second "off" interval and a subsequent polarity reversal as the electrodes extend along the entire coupling interval L, of which only a portion is shown.

In each of the devices shown in FIGS. 8, 14 and 15 the technique of periodic phase reversal is employed to resolve the problem of velocity mismatch.

Electrooptic Devices with Multifrequency Response Characteristics Employing Intermittent Interaction In a second class of traveling wave devices, as disclosed by Liu in his above-identified application, effective velocity match is achieved by means of intermittent interaction. In accordance with this technique, the electrodes are simply decoupled from the optical waveguide by removing them from the region of the optical waveguide whenever the velocity mismatch results in a polarity reversal of the modulating signal. Thus, in this prior art device $L_{off} = \delta L_{on}$ and $R=1$. In accordance with the present invention, the relative values of $L_{off}$ and $L_{on}$ are changed such that $R > 1$. In particular, the length $L_{on}$ of the "on" interval is reduced as required to obtain the desired frequency response.

The frequency $f_d$ at which the velocity match condition is satisfied for a given aspect ratio R and interaction interval $L_{on}$ is given by $$\frac{2\pi N_m f_d \delta L_{on}}{c} (1 + R) = 2\pi \qquad (11)$$

If equation (11) is compared with the corresponding equation (4) for the phase reversed electrode devices, it will be noted that the velocity matched frequency, $f_d$, of the intermittent interaction device for the same value on $L_{on}$ and R is twice that of the phase reversed electrode devices, and that in the case of the intermittent interaction device, peaks occur at all harmonics, not only the odd harmonics. Use will be made of this fact as will be explained hereinbelow.

Figure 16:
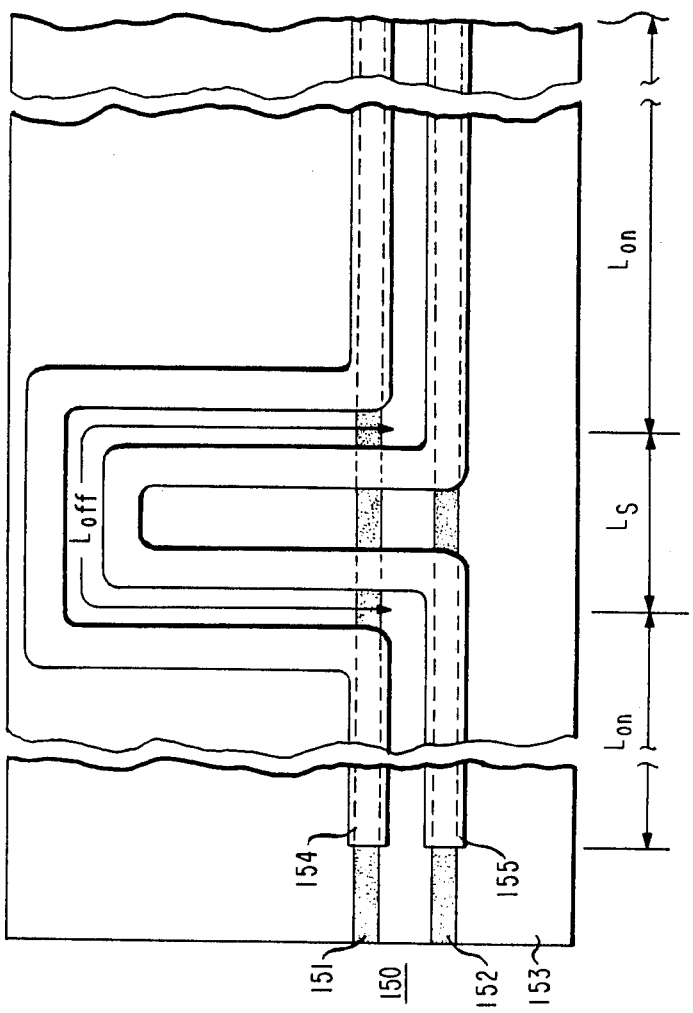
Figure 17:
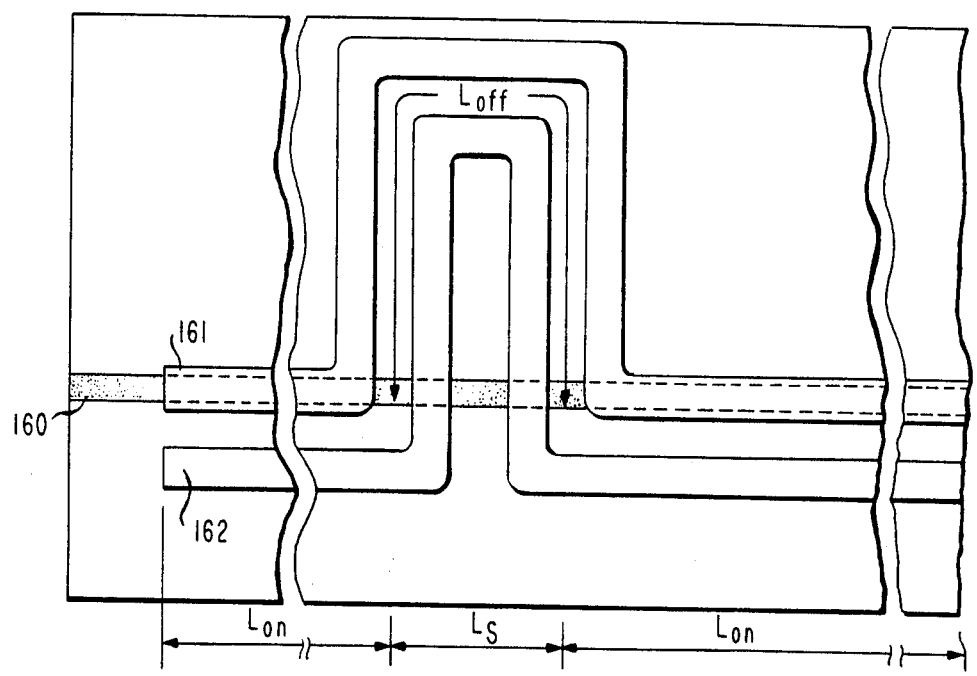
Figure 18:
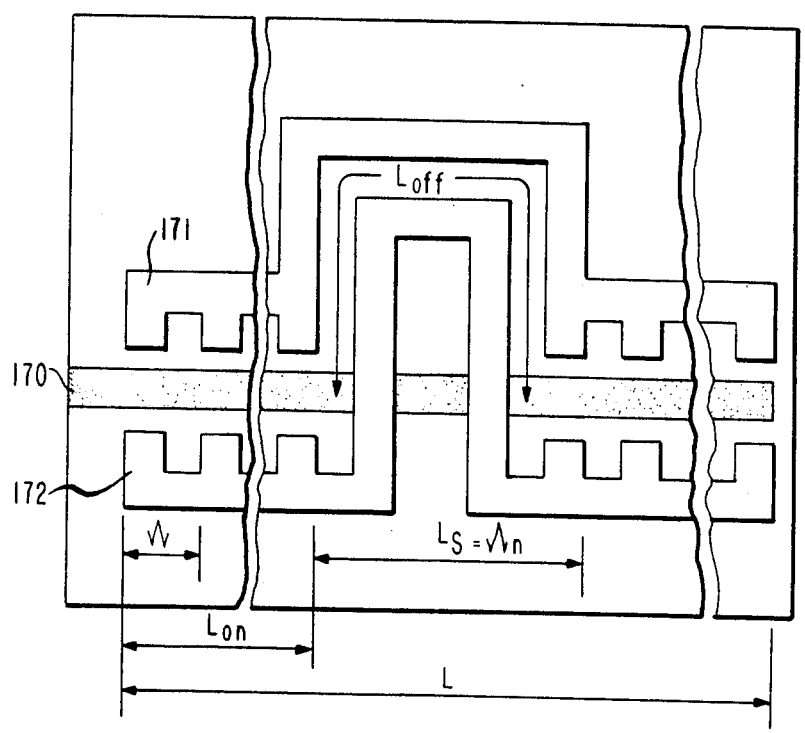

FIGS. 16, 17 and 18 show various embodiments of intermittent interaction traveling wave devices, in accordance with the present invention, including, respectively, a directional coupler, a phase shifter and a mode converter. They are in many respects similar to the devices described hereinabove wherein the electrodes are configured to include a series of "on" intervals of the length $L_{on}$ separated by "off" intervals of length $L_{off}$. These devices differ, however, in that there is no phase reversal provided by the position of the electrode structures and, as a consequence, the relative lengths of the "on" and "off" intervals are different than on the previously described devices.

4. Directional Coupler with Intermittent Interaction

In the embodiment of FIG. 16 the electrodes 154 and 155 extend over the optical waveguiding strips 151,152 of optical directional coupler 150 to form a first "on" interval. This is followed by a first "off" interval wherein the electrodes loop away from the optical waveguides. At the end of the "off" interval, the electrodes are returned and occupy the same positions relative to the optical paths. Thus, electrode 154 extends over wavepath 151, and electrode 155 extends over wavepath 152. This "on-off" electrode configuration is repeated along the entire length of the device.

5. Phase Shifter with Intermittent Interaction

In the phase shifter illustrated in FIG. 17, one of the electrodes, 161, extends over the optical waveguiding strip 160 along each of the "on" intervals. In the intervening "off" intervals the two electrodes 161 and 162 loop away from the optical wavepath.

6. Mode Converter with Intermittent Interaction

The mode converter shown in FIG. 18 is substantially identical with that shown in FIG. 14 comprising a pair of finger electrodes disposed along opposite side of optical waveguide 170. In the phase reversal embodiment of FIG. 14, the length $L_s$ along the optical wavepath occupied by the "off" region is equal to $(n+\frac{1}{2})$. In the embodiment of FIG. 17, where there is no phase reversal, $L_s = n/$ . In all of the embodiments $L_s << L_{on} < d_o$.

Uniform Broadband Response

For many modulator applications, a nominally flat frequency response from zero to some high frequency is required. While the artificial velocity matching techniques described herein provide a means for moving the available bandwidth to higher frequencies or, as explained hereinabove, to divide it among many harmonically related frequencies, there is no net increase in the total available bandwidth. It is merely redistributed across the band of interest. However, as indicated hereinabove, the response peaks for the two types of velocity matching electrode configuration do not occur at the same frequencies. For the phase reversal electrode configuration, the peaks occur at odd harmonics of $f_d$. For the intermittent interaction electrode configuration, peaks occur at zero frequency and all harmonics of $2f_d$. If, therefore, the two electrode configurations are combined in a single device, the response peaks can be interleaved to form either a uniform response wherein the peaks of one response fills the voids of the other, or to form a comb response. In either case, an approximate doubling of the available bandwidth can be realized.

Figure 19:
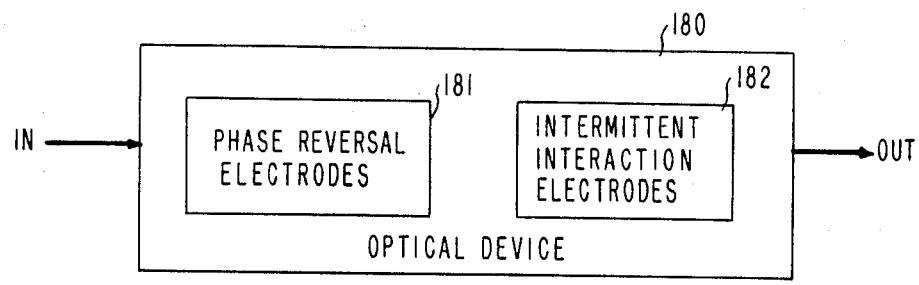
FIG. 19 shows, in block diagram, a device using both phase-reversal and intermittent interaction electrode configurations in accordance with the present invention.
Figure 20:
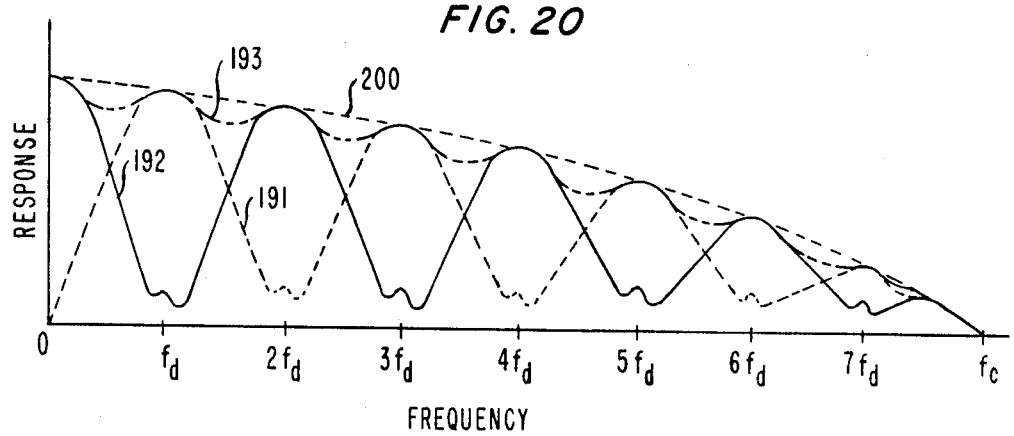
FIG. 20 shows the response characteristic of the device of FIG. 19.

FIG. 19 shows, in block diagram, a traveling wave optical device 180 including, in cascade, a set of phase reversal electrodes 181, and a set of intermittent interaction electrodes 182. For a given material system, the envelope term, illustrated by curve 200 in FIG. 20, has the same cutoff frequency $f_c$ for the two electrode sections. The response peaks for the phase reversal electrodes, given by the dashed curve 191, occur at frequencies $f_d$, $3f_d$, $5f_d$ and $7f_d$. The response peaks for the intermittent interaction electrodes, given by solid curve 192, occur at zero frequency and harmonics of $2f_d$. The net device response is given by curve 193.

In some devices, it is possible to make more efficient use of the modulating signal circuit. Instead of simply cascading the two electrode configurations, as indicated in FIG. 19, it may be feasible to utilize a single electrode circuit wherein the "off" interval for one optical signal serves as the "on" interval for the other and vice-versa. An example of such dual use is illustrated in FIG. 21 which shows two phase shifters connected in parallel to form an interferometer.

Each phase shifter comprises an optical waveguide 122, 123. The two are coupled at one end to a common input waveguide 120 and at their other end to a common output waveguide 128. A pair of electrodes 124, 125 are disposed along the two optical waveguides to form, along one of the waveguides 123, an intermittent interaction electrode configuration, and along the other waveguide 122 a phase reversal electrode configuration. More specifically, the electrodes are disposed along waveguide 123 to form a first "on" interval 126-1. They are then directed away from waveguide 123 to form a first "off" interval. However, a portion of that "off" interval is positioned alongside waveguide 122 to form a first "on" interval 127-1 therealong. At the end of interval 127-1, the electrodes are displaced back alongside waveguide 123 to form a second "on" interval 126-2. Following this, they are again displaced alongside waveguide 122 to form a second "on" interval 127-2 for this waveguide.

It will be noted that along waveguide 123, the relative positions of the electrodes and the waveguide are the same. That is, in both "on" sections 126-1 and 126-2 electrode 124 is positioned above waveguide 123. Thus, the electrodes form an intermittent interaction configuration with respect to waveguide 123. By contrast, along waveguide 122, the relative positions of the electrodes changes such that whereas electrode 124 is positioned over waveguide 122 along "on" interval 127-1, electrode 125 is positioned over the waveguide along the second "on" interval 127-2. Thus, insofar as waveguide 122 is concerned, the electrodes are in the phase reversal configuration.

For modulator applications, such as broadband signal encoding for lightwave systems, it is necessary that the phase as well as the amplitude response be relatively flat over the frequency range of interest. Therefore, when broadbanding by using the combination of the phase reversal and intermittent interaction electrodes, it is important that the phase response be equal at the harmonics of $f_d$. Investigation of equation (5) indicates that that is the case provided an even number of sections is used for the intermittent interaction electrode and an odd number for the phase reversal electrode.

It will be appreciated that over the "on" interval the location of the electrodes relatively to the optical waveguide depends upon the cut of the substrate crystal. In the various illustrative embodiments it was assumed that the crystal cut was such that the operative electric field direction was normal to the plane of the device. As such, the electrodes were shown located above the optical waveguides. If, however, the crystal cut is such that the operative electric field direction is parallel to the plane of the device, the optical waveguide would be placed differently, i.e., between the electrodes. Thus, other electrode configurations will result, depending upon the nature and properties of the materials employed. The specific embodiments described are merely intended to be illustrative.

What is claimed is:

1. A device comprising:
a substrate comprising electrooptic material;
first waveguiding means adapted for guiding electromagnetic radiation of optical wavelengths, such radiation to be referred to as the "optical signal", the first waveguiding means comprising at least one waveguide formed in the substrate, the waveguide to be referred to as the "optical waveguide"; and
second waveguiding means, disposed on the substrate, adapted for supporting a propagating electrical signal comprising a wavelength $\lambda_m$, the second waveguiding means comprising a multiplicity of spaced sections, to be referred to as the "on" sections, that are disposed such that the propagating electrical signal does operatively interact with the optical waveguide by means of the electrooptic effect, such relationship to be referred to as an "electrooptically interacting" relationship, and further comprising at least one further section, to be referred to as the "off" section, that is disposed such that the propagating electrical signal does not operatively interact with the optical waveguide by means of the electrooptic effect, such relationship to be referred to as an "electrooptically noninteracting" relationship, the "off" section being located between two "on" sections;
characterized in that
each "on" section is substantially of length $L_{on}$, the at least one "off" section is substantially of length $L_{off}$, with
$$L_{off} > (1 - N_o/N_m)L_{on}$$
where:
$N_o$ is the effective refractive index of the optical waveguide at the wavelength of the optical signal; and:
$N_m$ is the effective refractive index of the second waveguiding means at the wavelength $\lambda_m$ of the electrical signal.

2. The device of claim 1, wherein the device is an optical phase shifter, the optical waveguide being adapted for guiding at least one TE mode and at least one TM mode of the optical signal, associated with each of the modes being a phase constant, and wherein the second waveguiding means are disposed such that the electrooptic interaction can change the value of at least one of the phase constants.

3. The device of claim 1, wherein the device is a directional coupler, with the first waveguiding means comprising a pair of coupled optical waveguides, associated with each of the optical waveguides being a phase constant, and wherein the second waveguiding means are disposed such that the electrooptic interaction can change the value of at least one of the phase constants.

4. The device of claim 1, wherein the device is a mode converter, the optical waveguide being adapted for guiding at least one TE mode and at least one TM mode of the optical signal, associated with the device being an electrooptically induced TE/TM coupling coefficient, and wherein the second waveguiding means are disposed such that the electrooptic interaction can change the TE/TM coupling coefficient.

5. The device of claim 1, wherein the second waveguiding means are disposed such that, at the optical waveguide, the operative electric field due to a given "on" section has a polarity that is opposite to the polarity of the operative electric field due to the "on" section adjacent to the given "on" section.

6. The device according to claim 1 wherein said device is characterized by a coherence length, $d_o$, given by $$d_o = \frac{\lambda_m}{2N_m}(1 - N_o/N_m)^{-1};$$

and wherein $L_{on} < d_o$.

7. The device according to claim 5 wherein $L_{on} + L_{off}(1 - N_o/N_m) = d_o$.

8. The device according to claim 1 wherein:
said device includes N pairs of "on-off" intervals; and wherein $$L_{on} + L_{off}(1 - N_o/N_m) = 2d_o.$$

9. The device of claim 6, wherein the first waveguiding means comprise coupled first and second optical waveguides, the second waveguiding means comprise a plurality of electrodes including a center electrode and a first and a second outer electrode;
wherein the electrodes are disposed such that in a first "on" section the center electrode and the first outer electrode are in electrooptically interacting relationship with the first and the second optical waveguides, respectively, and the second outer electrode is in electrooptically noninteracting relationship with the optical waveguides;
wherein the electrodes further are disposed such that in a second "on" section, adjacent to the first "on" section, the center electrode and the second outer electrode are in electrooptically interacting relationship with the second and first optical waveguides, respectively, and the first outer electrode is in electrooptically noninteracting relationship with the optical waveguides; and
wherein the first and second "on" sections are separated by an "off" section in which the electrodes are disposed such that none of the three electrodes are in electrooptically interacting relationship with one of the two optical waveguides.

10. The device of claim 1, wherein the first waveguiding means comprise a single optical waveguide, and the second waveguiding means comprise a pair of electrodes, with a gap therebetween, and wherein the electrodes are disposed such that in at least a part of each "on" section the gap between the electrodes is closer to the optical waveguide than the gap is in at least a part of each "off" section.

11. The device of claim 10, wherein the optical waveguide is adapted for guiding at least one TE mode and at least one TM mode of the optical signal, and wherein the electrodes in at least some of the "on" sections comprise finger electrodes whose nominal finger-to-finger spacing is equal to $\Lambda$, where $\Lambda = \lambda_o (N_{TE} - N_{TM})^{-1}$, wherein $\lambda_o$ is the free-space wavelength of the optical signal; and $N_{TE}$ and $N_{TM}$ are the effective refractive indices of the optical waveguide for the TE and TM modes, respectively.

12. The device of claim 11, wherein the distance $L_s$ along the optical waveguide of the "off" section is substantially equal to $n\Lambda$, where n is a positive integer, and $L_s << L_{on}$.

13. The device of claim 11, wherein the distance $L_s$ along the optical waveguide of the "off" section is substantially equal to $(n+\frac{1}{2})\Lambda$, where n is a positive integer, and $L_s << L_{on}$.

14. The device of claim 1, wherein the second waveguiding means comprise a first portion comprising a first plurality of "on" sections and, in series with the first portion, a second portion having a second plurality of "on" sections, and wherein in the first portion the second waveguiding means are disposed such that, at the optical waveguide, the operative electric field due to a given "on" section has a polarity that is opposite to the polarity of the operative electric field due to the "on" section adjacent to the given "on" section.

15. The device of claim 1, wherein the first waveguiding means comprise a pair of optical waveguides, and wherein the second waveguiding means are disposed such that at least a part of the second waveguiding means is in electrooptically interacting relation with both members for the pair of optical waveguides.

16. The device according to claim 10 wherein:
said electrodes, along successive "on" intervals, are transversely displaced relative to said optical waveguide to produce a polarity reversal in the direction of the electric field operative along said optical waveguide.

17. The device according to claim 15 wherein:
said waveguiding means is a pair of electrodes forming a planar strip transmission line;
and wherein the "on" interval along one of said optical waveguides is the "off" interval for the other of said optical waveguides, and said "off" interval along said one optical waveguide is the "on" interval for said other optical waveguide.

18. The device according to claim 17 wherein:
the input ends of said optical waveguides are coupled to a first common port;
and wherein the output ends of said optical waveguides are coupled to a second common port.

* * * * *